STEREOPHONIC BROADCAST RECEIVER CIRCUIT ARRANGEMENT FOR SYSTEMS OPERATING WITH PILOT SIGNALS

Filed March 12, 1965

Inventor:

Egon Frank

United States Patent Office 3,309,465
Patented Mar. 14, 1967

3,309,465

STEREOPHONIC BROADCAST RECEIVER CIRCUIT ARRANGEMENT FOR SYSTEMS OPERATING WITH PILOT SIGNALS

Egon Frank, Berlin, Germany, assignor to Loewe Opta G.m.b.H., Berlin, Germany, a company of Germany Filed Mar. 12, 1965, Ser. No. 439,485
Claims priority, application Germany, Mar. 21, 1964, L 47,360
4 Claims. (Cl. 179—15)

Figures 1, 2:
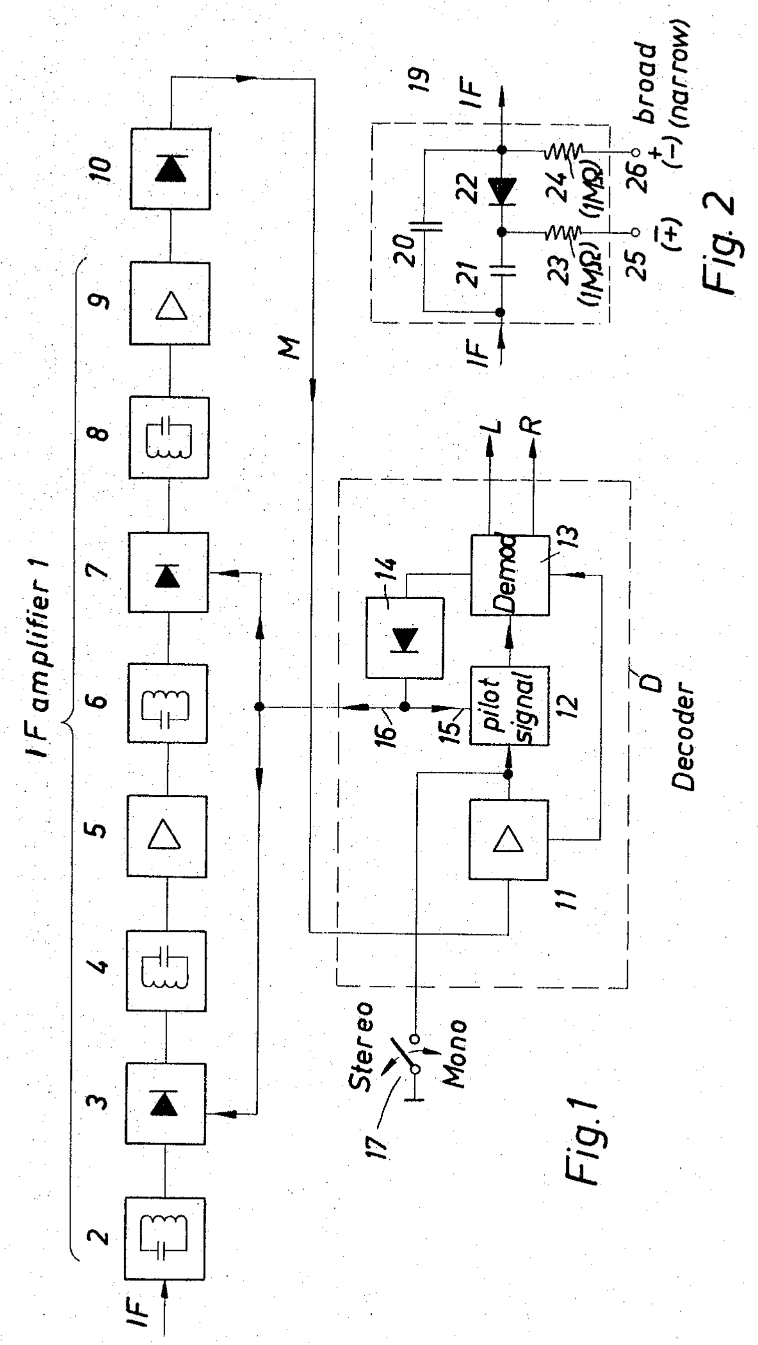

The invention relates to a stereophonic broadcast receiver circuit arrangement for systems operating with pilot signals and aims at improving such devices with regard to the different demands for selectivity in monophonic reception on the one hand and stereophonic reception on the other. As is known as prerequisite for correct stereophonic transmission is that the high frequency (HF) or intermediate frequency band transmitted must be 1.5 times broader than in monophonic. To avoid special expenditure in fulfilling these different selectivity conditions in "stereo" and "mono" operations it is general practice to compromise between the two optima of the above named two types of operation. The consequence is that in mono-reception the selectivity degenerates below the requisite standard and on the other hand in stereo-reception signal distortions resulting from the too narrow band must be accepted.

The radio receiver devices fitted, for reception of stereophonic broadcasts transmitted on the so-called "pilot signals" method, with two low frequency channels and a so-called "stereo-decoder" for separating the multiplex signal, are known to have a changeover switch for the two types of reception, "Mono" and "Stereo." This changeover switch enables mono broadcasts to be received without the intervention of the decoder, thus reducing receiver susceptibility to electrical interference. There is a known method of making this changeover automatically by means of a relay, picking up a control voltage derived from the pilot signal, or else purely electronically, e.g., by using diodes. It has also been proposed to perform the electronic changeover instantaneously by using a novel circuit arrangement starting from a definite threshold value of the pilot voltage. The control voltage which suddenly appears here first releases the stereo operation in the decoder, secondly gives e.g. a light indicator signal of stereo reception and thirdly in accordance with the invention will be utilized for changing over the band width in the intermediate frequency portion of the receiver.

Accordingly the invention is characterized in that in the presence of a stereo broadcast with a minimum field strength an automatic switchover of the intermediate frequency amplifier to wide band selectivity occurs. This step is realized electronically by electronic controls, e.g. diodes, causing an electronic switchover of the band width in the intermediate frequency amplifier by connecting-in other coupling capacitance factors, so that the selectivity characteristic is frequency widened. The requisite control voltage is derived from the decoder with threshold value automatic means when stereo receiving, namely when in the decoder changeover is made from mono to stereo reception. This electronic switchover can also be done in several intermediate frequency stages. This switchover in accordance with the invention will e.g. widen the selectivity characteristic of the intermediate frequency amplifier by 50 percent (approx.) in transition from mono to stereo reception.

Further in accordance with the invention a key is also provided, the so-called "Stereo key," which enables the receiver to switch back to mono reception after automatic stereo switchover, namely e.g. by short-circuiting the pilot voltage. This is advantageous where in stereo reception interference is such as to prevent proper stereo reproduction.

The circuit arrangement in accordance with the invention is now described in detail with the exemplary designs shown in the illustrations:

FIG. 1 shows merely schematically the intermediate frequency amplifier with the adjacent decoder and FIG. 2 shows the form of design for an electronic coupling element in the intermediate frequency amplifier.

The intermediate frequency amplifier 1 in FIG. 1 consists of a first band filter, consisting of filer elements 2 and 4, and a second band filter, consisting of filter elements 6 and 8. Between each of these band filter elements lies one electronic coupling element 3 and 7, which in accordance with the invention can consist of e.g. diode switches which when a control voltage derived from the decoder D is released change the selectivity of this band filter so that in transition from mono to stereo reception the particular band filter of the intermediate frequency amplifier is switched over to wide band selectivity.

5 and 9 are each intermediate frequency amplifier stages and 10 is the end ratio detector which gives the multiplex voltage over wire M to decoder D, which works with threshold value automatic means. This decoder consists of an input amplifier 11, the pilot voltage source 12 and the adjacent time-division multiplex demodulator 13, from which the two low frequency channels L and R lead in a known manner over corresponding low frequency amplifier devices to the appropriate loudspeakers (these last not shown).

14 is the threshold value automatic means which when the pilot voltage is received effects the automatic changeover, itself known and not shown in detail, of decoder D from mono to stereo reception, namely over wire 15. At the same time this control voltage derived from element 14 causes in accordance with the invention over wire 16 a switchover of the electronic coupling elements 3 and 7 of the intermediate frequency amplifier 1. This circuit connection changes band filter circuits 2, 4 and 6, 8 in their selectivity—as mentioned above—so that in transition from mono to stereo reception the band filter characteristic is widened, i.e. there is wide band selectivity.

17 is the above-mentioned "Stereo key." With this key the pilot voltage in the decoder can be short circuited so that therefore the automatically performed switchover from mono to stereo reception can be reversed and mono reception restored. This is necessary so that in case of need in the prevailing reception conditions poor stereo reception (with interference) can be switched off and mono, which is less susceptible to interference, used.

FIG. 2 shows an exemplary design for the electronic coupling element 19 in the intermediate frequency amplifier. Such elements 19 can be used for elements 3 and 7 in FIG. 1.

The coupling capacitances are marked 20 and 21, 22 is a switch diode and 23, 24 are high-ohm decoupling resistances. Over terminals 25, 26 the control voltage fed in accordance with FIG. 1 over wire 16 is put in. If terminal 26 is positive in relation to 25, switch diode 22 is conductive and capacitors 20 and 21 are cut-in to the coupling path of the intermediate frequency filter 2, 4 so that a wide band is transmitted. If, however, the poling is reversed, switch diode 22 is suppressed and capacitor 21 thus cut out of the transmission path of the band filter. Only capacitance 20 is therefore effective and accordingly a narrow frequency band is transmitted in the intermediate frequency amplifier.

The advantage of the circuit arrangement in accordance with the invention is seen in the fact that simultaneously with the automatic changeover of the decoder from mono to stereo reception the intermediate frequency is also adapted to the optimal conditions for stereo reception (i.e. wide band selectivity). In particular in mono reception the normal selectivity is retained, enabling better selectivity in unfavourable reception conditions, while in stereo reception the wider multiplex spectrum can also be transmitted without compromise.

What I claim is:

1. FM multiplex stereophonic receiver for systems operating with pilot signals comprising an IF-amplifier, electronic coupling elements followed by filter circuits in said IF-amplifier, a decoder connected in series to said IF-amplifier, means for producing automatically a control voltage dependent on the presence of a pilot signal within said decoder and for applying said control voltage to said electronic coupling elements, said control voltage being adapted to change over the band width of said filter circuits, thus enabling the transmission of a widened frequency band in case of stereo signals.

2. FM multiplex stereophonic receiver for systems operating with pilot signals comprising an IF-amplifier, electronic coupling elements followed by filter circuits in said IF-amplifier, a decoder connected in series to said IF-amplifier, means for producing automatically a control voltage dependent on the presence of a pilot signal within said decoder and for applying said control voltage to said electronic coupling elements, said means for producing automatically a control voltage consisting of a suitably biassed diode circuit system adapted to generate a direct voltage signal as soon as a pilot signal voltage is received within said decoder, said electronic coupling elements being directly connected to said decoder for receiving said control voltage adapted to change over the band width of said filter circuits in said IF-amplifier, thus enabling the transmission of a widened frequency band in case of stereo signals.

3. FM multiplex stereophonic receiver for systems operating with pilot signals comprising an IF-amplifier, electronic coupling elements followed by filter circuits in said IF-amplifier, a decoder connected in series to said IF-amplifier, means for producing automatically a control voltage dependent on the presence of a pilot signal within said decoder and for applying said control voltage to said electronic coupling elements, said means for producing automatically a control voltage consisting of a suitably biassed diode circuit system adapted to generate a direct voltage signal as soon as a pilot signal voltage is received within said decoder, said electronic coupling elements consisting of a switch diode connected in series with a coupling capacitance into the path of said IF-amplifier, said series connection being bridged by a second coupling capacitance, said switch diode being further connected with its terminals via high-ohmic resistances to said suitably biassed diode circuit system within said decoder producing said control voltage, said switch diode being thus adapted to be conductive or not conductive in accordance with the polarity of said control voltage and to let pass a wide or narrow frequency band through said IF-amplifier.

4. FM multiplex stereophonic receiver for systems operating with pilot signals comprising an IF-amplifier, electronic coupling elements followed by filter circuits in said IF-amplifier, a decoder connected in series to said IF-amplifier, means for producing automatically a control voltage dependent on the presence of a pilot signal within said decoder and for applying said control voltage to said electronic coupling elements, said control voltage being adapted to change over the band width of said filter circuits, thus enabling the transmission of a widened frequency band in case of stereo signals and a key for switching said decoder to mono reception by hand.

References Cited by the Examiner

UNITED STATES PATENTS

| | | | |
|---|---|---|---|
| 2,917,572 | 12/1959 | Stubbe | 175—5.8 |
| 2,976,408 | 3/1961 | Colaguori | 325—427 |
| 3,020,339 | 2/1962 | Richman | 178—5.4 |
| 3,025,343 | 3/1962 | Waring | 178—5.8 |
| 3,250,857 | 5/1966 | De Vries et al. | 179—15 |

DAVID G. REDINBAUGH, *Primary Examiner.*

ROBERT L. GRIFFIN, *Examiner.*